(12) United States Patent
Bechhoefer (10) Patent No.: US 11,048,774 B1
(45) Date of Patent: *Jun. 29, 2021

(54) ROTATING BODY MONITORING AND ALERT SYSTEM AND METHOD

(71) Applicant: GPMS International, Inc., Cornwall, VT (US)

(72) Inventor: Eric Robert Bechhoefer, Cornwall, VT (US)

(73) Assignee: GPMS International, Inc., Cornwall, VT (US)

(*) Notice: Subject to any disclaimer, the term of this patent is extended or adjusted under 35 U.S.C. 154(b) by 0 days.

This patent is subject to a terminal disclaimer.

(21) Appl. No.: 16/589,356

(22) Filed: Oct. 1, 2019

Related U.S. Application Data (63) Continuation-in-part of application No. 14/965,210, filed on Dec. 10, 2015, now Pat. No. 10,466,139.

(60) Provisional application No. 62/090,315, filed on Dec. 10, 2014.

(51) Int. Cl.
| | |
|---|---|
| *G06F 17/18* | (2006.01) |
| *G01M 13/00* | (2019.01) |
| *G06Q 10/00* | (2012.01) |
| *G06F 17/17* | (2006.01) |

(52) U.S. Cl.
CPC ........... *G06F 17/18* (2013.01); *G01M 13/00* (2013.01); *G06F 17/17* (2013.01); *G06Q 10/20* (2013.01)

(58) Field of Classification Search
CPC ........ G06F 17/18; G06F 17/17; G01M 13/00; G06Q 10/20
See application file for complete search history.

(56) References Cited

U.S. PATENT DOCUMENTS

| | | | |
|---|---|---|---|
| 10,466,139 B2* | 11/2019 | Bechhoefer | G01M 13/028 |
| 2011/0125419 A1* | 5/2011 | Bechhoefer | F03D 7/047 702/34 |
| 2015/0330950 A1* | 11/2015 | Bechhoefer | G01N 29/14 73/587 |

OTHER PUBLICATIONS

Baraldi, Piero, Francesca Mangili, and Enrico Zio. "Ensemble of bootstrapped models for the prediction of the remaining useful life of a creeping turbine blade." In 2012 IEEE Conference on Prognostics and Health Management, pp. 1-8. IEEE, 2012. (Year: 2012).*

(Continued)

*Primary Examiner* — Luis A Sitiriche
*Assistant Examiner* — Casey R. Garner
(74) *Attorney, Agent, or Firm* — Shawn Gordon; Dunkiel Saunders Elliott Raubvogel & Hand, PLLC (57) ABSTRACT

A system and method as disclosed herein develops a predicted current remaining useful life (RUL) of a component through a generalized fault and usage model that is designed through a process of simplifying Paris' Law (or other power law) in conjunction with a Kalman Smoother (or other filtering technique). One of the many advantages of this state observer technique is that the backward/forward filtering technique employed by the Kalman Smoother has no phase delay, which allows for the development of a generalized, zero tuning model that provides an improved component health trend, and therefore a better estimate of the predicted current RUL.

13 Claims, 10 Drawing Sheets

(56) References Cited

OTHER PUBLICATIONS

Lall, Pradeep, Chandan Bhat, Madhura Hande, Vikrant More, Rahul Vaidya, and Kai Goebel. "Prognostication of residual life and latent damage assessment in lead-free electronics under thermomechanical loads." IEEE Transactions on Industrial Electronics 58, No. 7 (2010): 2605-2616. (Year: 2010).*

* cited by examiner

ROTATING BODY MONITORING AND ALERT SYSTEM AND METHOD

RELATED APPLICATION DATA

This application is a continuation-in-part of U.S. application Ser. No. 14/965,210, filed Dec. 10, 2015 and titled "Rotating Body Monitoring and Alert System and Method," which claims the benefit of U.S. Provisional Application Ser. No. 62/090,315, filed Dec. 10, 2014 and titled "Rotating Body Monitoring and Alert System and Method," each of which is incorporated herein in its entirety.

FIELD OF THE INVENTION

The present invention generally relates to rotating body diagnostic systems. In particular, the present invention is directed to a Rotating Body Monitoring and Alert System and Method.

BACKGROUND

Diagnostics of rotating components are a maturing field. Various studies have disclosed a number of analysis techniques for monitoring rotating components, such as synchronous analyses (primarily for shafts and gears) and non-synchronous analyses (primarily for bearings). Synchronous analysis is based on a time synchronous average (TSA) so as to eliminate signal components that are not synchronous with the rate of rotation of the shaft or gear, whereas non-synchronous analyses generally use some type of demodulation and enveloping, returning the energy associated with the fault frequency of the item under analysis (e.g., bearing).

For shaft/gear analyses, a further analysis of the TSA is typically performed to give an indication of the condition of the object under surveillance. These other analyses can be a statistic of the time domain waveform (e.g., TSA root mean square (RMS), TSA Kurtosis, RMS of the TSA residual signal), statistics based on time and frequency domain waveforms (e.g., Figure of Merit (a quantity used to characterize the performance of a device, system or method, relative to its alternatives) 0, in which the TSA peak to peak is divided by gear mesh energies), or the frequency domain itself (first harmonic of the shaft speed, which is called the shaft order 1 magnitude). Whether from synchronous or non-synchronous analysis, these statistics are typically called "condition indicators" (CIs), which can be used to understand the diagnostics of the component under analysis.

In certain instances, the original equipment manufacturer (OEM) may have set nonconformity limits for some components (e.g., 1 inch per second on the shaft order 1 magnitude), to define when maintenance should be performed. However, most components have no formal limits and therefore, the operator or a health and usage monitoring system (HUMS) vendor is left to define component nonconformity thresholds.

SUMMARY OF THE DISCLOSURE

In a first exemplary aspect, a rotating body monitoring and alert system capable of measuring the remaining useful life of a component of a rotating machine is disclosed, the system comprising: a first monitoring device measuring a load on the component, the first monitoring device capable of sending a signal representative of the load; a processing module capable of receiving the signal, the processing module including a processor having a set of instructions for: developing a health indicator of the component based upon the signal; and developing a prediction of remaining useful life of the component based upon the health indicator.

In another exemplary aspect, a method of predicting the remaining useful life of a rotating component is disclosed, the method comprising receiving data representative of a condition of the rotating component; generating a health indicator based upon the receiving; predicting a remaining useful life of the rotating component based upon the generating; evaluating the predicting and generating so as to determine whether to alert an operator as to the condition of the rotating component.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

The ability to prognosticate the future state of a mechanical component can greatly improve the ability of an operator, such as a helicopter operator, to manage their assets, such as a helicopter. Fundamentally, prognostics can change the logistics support of a helicopter by reducing the quantity of spare parts, improving the likelihood of a deployment meeting its mission requirements, and reducing unscheduled maintenance events. A successful prognosis is typically based on applying a fault model and usage metrics (torque) to a diagnostic. A rotating body monitoring and alert system and method as described herein provides benefits, such as those described above, by transforming certain CIs into one or more Health Indicators (HI) using a whitening linear transform, as described in Bechhoefer, E.; He, D.; Dempsey, P., "Processing for Improved Spectral Analysis", Annual Conference of the Prognostics and Health Management Society, 2011, which assists in ensuring that the operational probability of false alarm (PFA) as observed in the field data, is the same as the system design PFA, and then estimating a remaining useful life (RUL) of the component under observation by the system.

In an exemplary embodiment, the scale and offset of the whitening linear transform is based on a generalized function of distribution technique that constructs an HI policy such that:

1. The probability of a nominal component having an HI greater than about 0.5 is less than about 10e-6, e.g., PFA is about 1-10e-6;
2. When the HI is greater than about 0.75 and less than about 1.0, the component is in warning (plan on scheduling maintenance); and
3. When the HI is greater than about 1.0, continued operations could result in collateral damage, e.g., damage to the gearbox or significant degradation in system performance.

As explained in more detail below, the HI policy discussed above can be used to alert operators as to the RUL of the component—that is, the RUL can be viewed as approximately the duration from a current HI value to an HI of 1.0 and thus, knowing the HI value gives the operator a prediction of the RUL, which allows an operator to better plan and manage the maintenance needs of their assets.

At a high level, a rotating body monitoring and alert system and method according to the present disclosure develops a current RUL of a component through a generalized fault and usage model that is designed through a process of simplifying Paris' Law (or other power law) in conjunction with a Kalman Smoother (or other filtering technique). One of the many advantages of this state observer technique is that the backward/forward filtering technique employed by the Kalman Smoother has no phase delay, which allows for the development of a generalized, zero tuning model that provides an improved component health trend, and therefore a better estimate of the current RUL.

Figure 1:
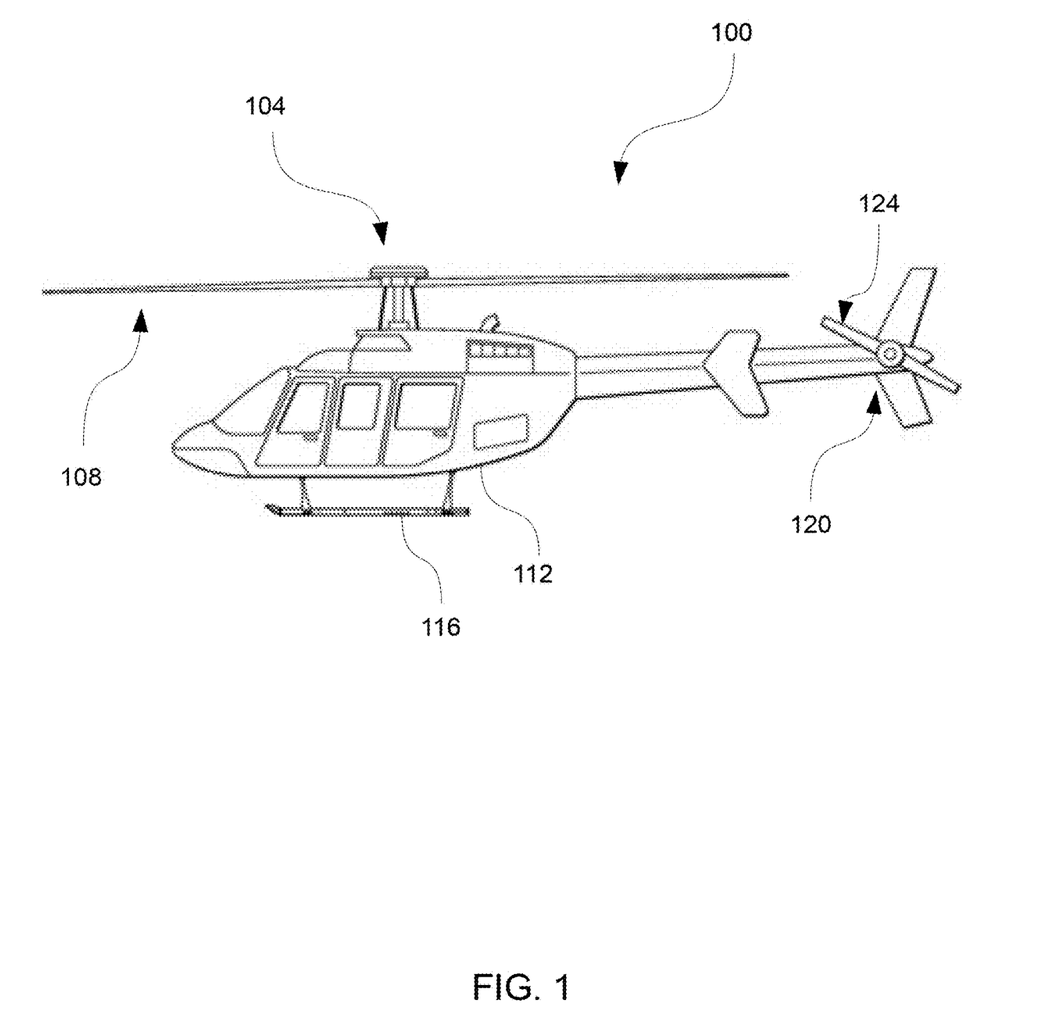
FIG. 1 is an illustration of a rotorcraft having one or more rotating components that can be monitored by embodiments of a rotating body monitoring and alert system and method as disclosed herein.

Turning now to the figures, and specifically to FIG. 1, there is shown a rotorcraft 100. At a high level, rotorcraft 100 includes a rotor system 104, a plurality of blades 108, a fuselage 112, a landing gear 116, and a tail assembly 120. Rotor system 104 is generally designed and configured to rotate the plurality of blades 108 and can include a control system for selectively controlling the pitch of each the plurality of blades 108 so as to control direction, thrust, and lift of rotorcraft 100. Rotor system 104 is coupled to fuselage 112, which is generally designed to carry the operator and other passengers, among other things. Fuselage 112 is coupled to landing gear 116, which supports rotorcraft 100 when rotorcraft 100 is landing and/or when rotorcraft 100 is at rest on the ground. Tail assembly 120 represents the tail section of the aircraft and can feature component similar to rotor system 104 and includes blades 124. Blades 124 may provide thrust in the same direction as the rotation of blades 108 so as to counter the torque effect created by rotor system 104. Teachings of certain embodiments relating to rotor systems described herein may apply to rotor system 104 and/or other rotor systems, such as other tilt rotor and helicopter rotor systems. It should also be appreciated that teachings from rotorcraft 100 may apply to aircraft other than rotorcraft, such as airplanes and unmanned aircraft, to name a few examples. Moreover, although the rotating body monitoring and alert system and method disclosed herein is described in association with rotorcraft 100, the system can effectively be coupled to any rotating component where there is a need to understand the remaining useful life of the component.

Figure 2:
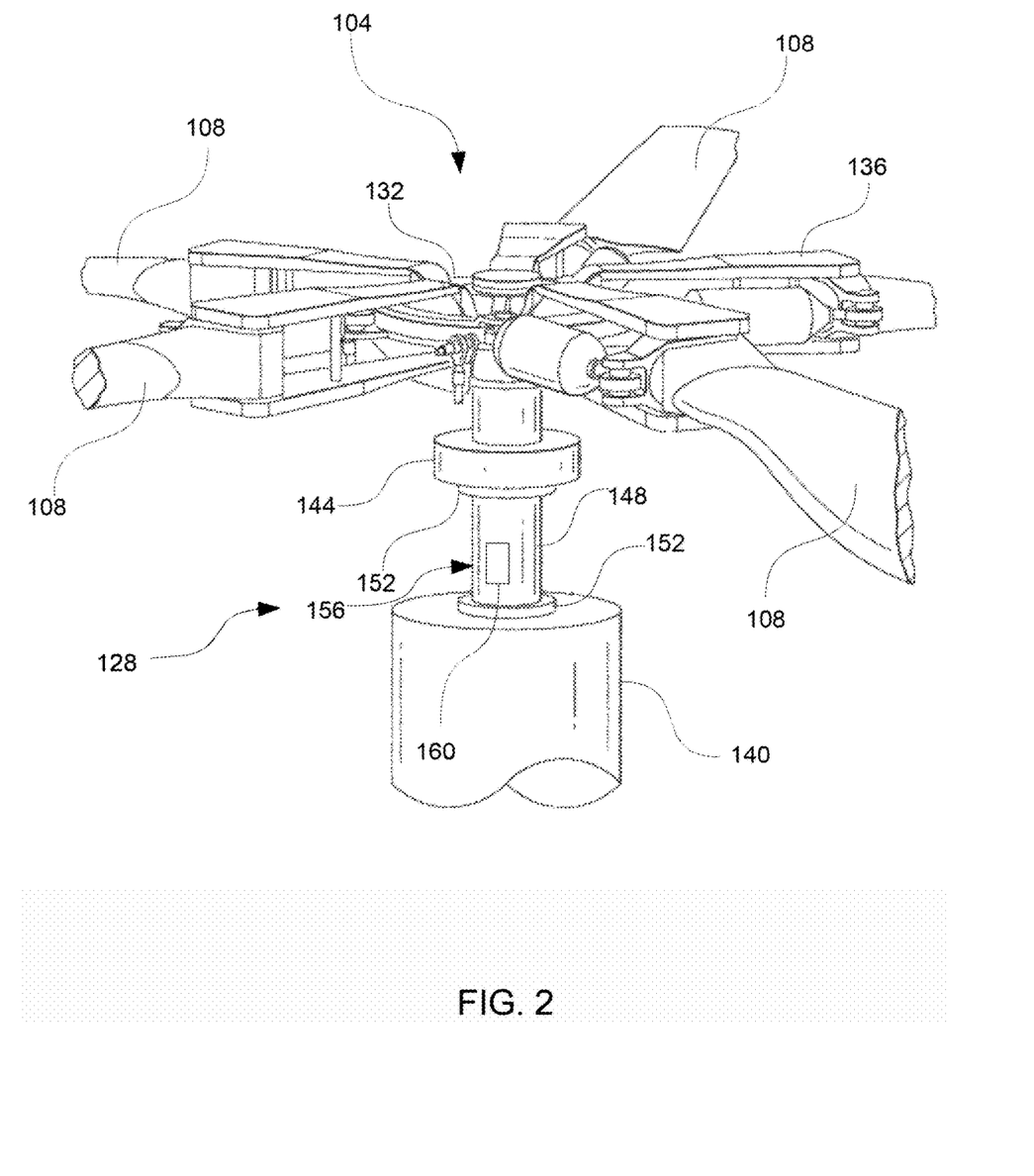
FIG. 2 is an illustration of a portion of rotorcraft having a portion of a rotating body monitoring and alert system according to an embodiment of the present invention.

FIG. 2 shows a more detailed illustration of rotor system 104. As with most rotor systems for rotorcraft, rotor system 104 features a drive train 128, a hub 132, and grips 136 coupled to blades 108. In this embodiment of rotor system 104, drive train 128 features an engine 140, a pylon 144, a drive shaft 148, and flexible couplings 152. Components such as engine 140, drive shaft 148, and hub 132, are mechanical components for generating and transmitting torque and rotation from engine 140 to blades 108. In operation, drive shaft 148 receives torque or rotational energy from engine 140 and rotates hub 132, which is coupled to blades 108 via grips 136. Also included with rotor system 104 is a sensor assembly 156 (which is part of a rotating body monitoring system, such as system 300, described in more detail below). Sensor assembly 156 is designed and configured to monitor the rotation of drive shaft 148. In an exemplary embodiment, sensor assembly 156 includes a strain gauge 160 coupled to drive shaft 148. In this embodiment, because drive shaft 148 is rotating, strain gauge 160 can be connected to its power source (not shown) and signal conditioning electronics via a slip ring (not shown). Alternatively, strain gauge 160 can also be connected via a transformer, eliminating the need for high maintenance slip rings. In general, the excitation voltage for strain gauge 160 is inductively coupled, and the strain gauge output is converted to a modulated pulse frequency for inclusion in rotating body monitoring and alert system, such as system 300, described in more detail below.

Figure 3:
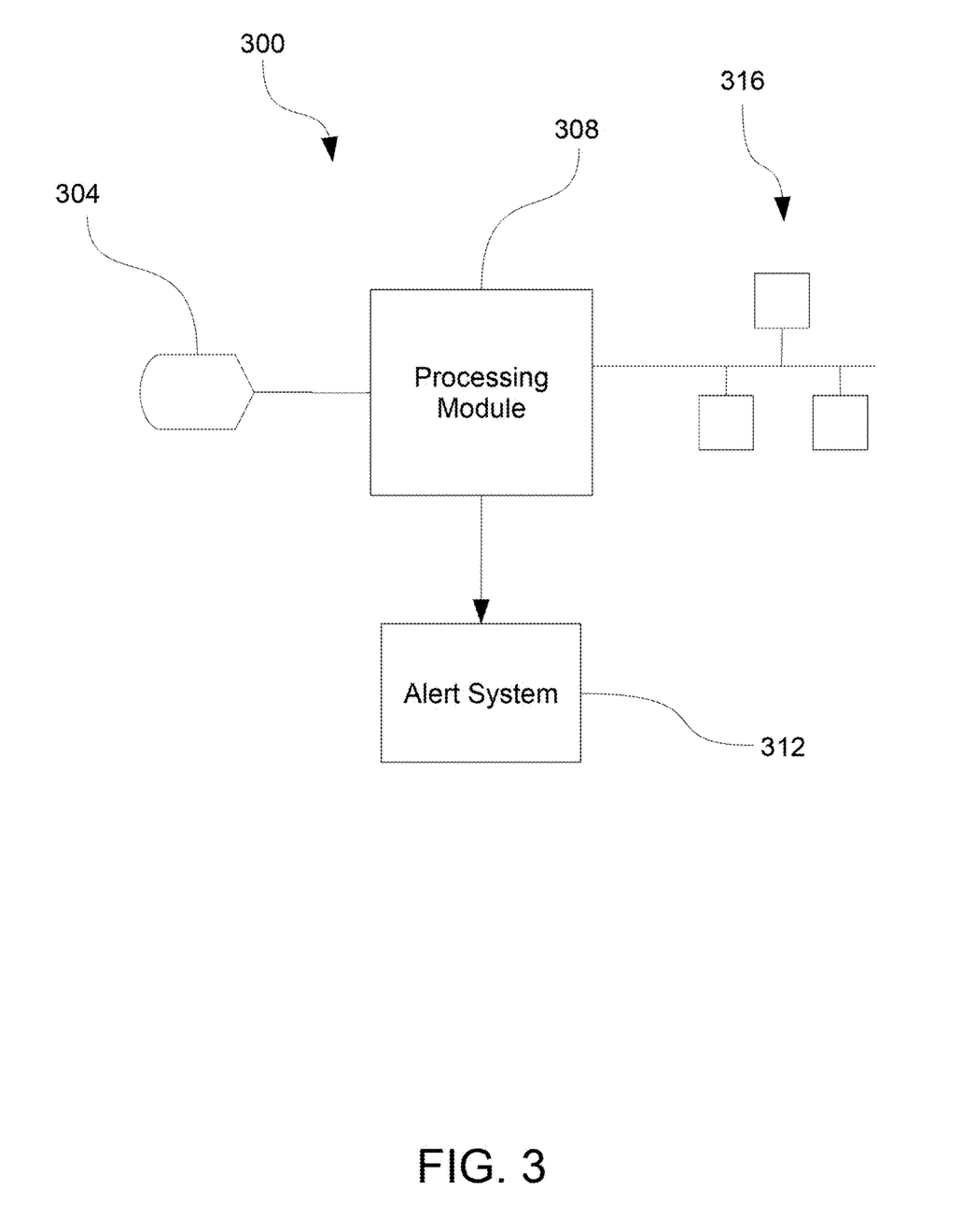
FIG. 3 is a block diagram of a rotating body monitoring and alert system according to an embodiment of the present invention.

At a high level, a rotating body monitoring and alert system according to the present disclosure such as system 300 shown in FIG. 3, includes one or more sensors 304, a processing module 308, and an alert system 312. Generally, sensors 304 gather information about the rotating structural component under observation and in an exemplary embodiment, sensors 304 capture torque data experienced by the rotating structural component. The information measured by sensor 304 is provided to processing module 308, which records the information from sensors 304, analyzes the data, and, if appropriate, provides information to alert system 312 or to the operator of the device under observation about the RUL. Alert system 312, as discussed further below, can be configured to provide escalating feedback about the RUL of the component. In another exemplary embodiment, processing module 308 stores the information in one or more databases 316 for analysis by maintenance operators after the end of the rotorcraft flight or when it is desired to evaluate the component.

From the information collected from sensors 304, a model can be deduced for the rotating component under evaluation and consequently, a RUL.

Processing module 308 uses a model developed for the rotating component under evaluation to develop a RUL via the methodology discussed just below.

RUL Calculations Using Paris' Law

Paris' Law is a sub-critical crack growth model for homogenous material. It relates the stress intensity factor, the stress intensity near the tip of a crack, to crack growth under fatigue. The model is: $da/dN = D(\Delta K)^m$, where:
  da/dN is the rate of change in the half crack length per cycle;

D is a material constant;
ΔK is the range of strain; and
m is the crack growth exponent.

The range of strain, ΔK, is defined as: $2\sigma\alpha(\pi a)^{1/2}$, where:
- σ is the gross strain, generally unknown but proportional to torque;
- α is a geometric correction factor, again generally unknown; and
- a is the half crack length, which is proportional to component health.

Each of variables σ, α, a, and D are usually specific for a given material. Paris' Law can be simplified by defining the crack growth exponent, m, as 2 (which is typical for steel), and collapsing the geometric correction factor, α, (an unknown constant), into D, then:

$$da/dN = D4\sigma^2\alpha a \quad \{\text{Equation 1}\}$$

where N is the number of cycles (which, for constant rate machines such as a helicopter gearbox, is proportional to time). The inverse of the function results in:

$$dN/da = (D4\sigma^2\pi a)^{-1} \quad \{\text{Equation 2}\}$$

Integrating this function gives Equation 3, below, which provides the number of cycles (i.e., time) from the current state $a_0$, to the remaining useful life state, $a_f$:

$$N = (D4\sigma^2\pi a_0)^{-1}(\ln(a_f) - \ln(a_0)) \quad \{\text{Equation 3}\}$$

In an embodiment, an unscented Kalman filter is used to estimate the unknown Paris' Law coefficients, e.g., σ, (as discussed in Bechhoefer, E., Clark, S., and He, D., "A State Space Model for Vibration Based Prognostics", Annual Conference of the Prognostics and Health Management Society, 2010, which is incorporated by reference for its discussion of the same) and the relevant HI, as developed from the relevant CI ((as discussed in Bechhoefer, E., Clark, S., and He, D., "A State Space Model for Vibration Based Prognostics", Annual Conference of the Prognostics and Health Management Society, 2010, which is incorporated by reference for its discussion of the same), can be used as a surrogate for initial crack length, $a_0$. Moreover, since, as described above, an HI of about 1 defines the lower boundary of when maintenance should be done, $\ln(a_f) = \ln(1) = 0$, (i.e., the final health or crack length is 1).

Although assuming the crack growth exponent is 2 is a reasonable first approximation, even when a component under analysis is steel there will be some variability is the actual value of the crack growth exponent among individual components. Further, if the rotating component under analysis is composed of a material other than steel, this assumption may not hold. Note that when the exponent m is 2 or is assumed to be 2, the integral of dN/da from the current value of $a_c$ to the value of $a_f$ (i.e., the time at which it is appropriate to perform maintenance on the component) results in Equation 3. However, in an alternative embodiment, the crack growth exponent, m, is determined by first estimating its value from the observed data itself. Consider the relationship given earlier as: $da/dN = D(\Delta K)^m$, where ΔK is defined as: $2\sigma\alpha(\pi a)^{1/2}$. Then, without loss of generality, the constants can be collected into D', at which point: $da/dN = D'(a)^{m/2}$. Taking the natural log of both sides yields:

$$\ln(da/dN) = \ln(D') + m/2 \ln(a) \quad \{\text{Equation 4}\}$$

Rearranging Equation 4 for m results in:

$$m = [\ln(da/dN) - \ln(D')]/\ln(a) \quad \{\text{Equation 5}\}$$

Note that an initial estimate for D' can also be calculated directly, as:

$$D' = [a_f^{(1-m/2)} - a_c^{(1-m/2)}]/[N(1-m/2)] \quad \{\text{Equation 6}\}$$

Again, note also without loss of generality, the crack length (damage) a is proportional to component health (HI), the current HI is calculated by the appropriate whitening transform of measured condition indicators, and the final HI value is 1 (i.e, when it is appropriate to do maintenance). Further, the HI measurement will necessarily include some corruption due to noise and the derivative of HI with respect to time (since for cycles, N is proportional to time) can be calculated using any number of state reconstruction mechanisms, such as Kalman, Unscented Kalman, Extended Kalman or Particle Filters. Then, once the crack growth exponent, m, is determined in this manner using measured data and applying Equation 5, its value can be used for m in $da/dN = D(\Delta K)^m$, at which point an integration (either symbolically or numerically) results in an estimate of the number of cycles left before maintenance is require, in other words, the remaining useful life based on a value of the crack growth exponent derived from observed data:

$$N \text{ (e.g., } RUL) = [1^{(1-m/2)} - a_c^{(1-m/2)}]/[D(1-m/2)(D4\sigma^2 \pi^{1/2})^m] \quad \{\text{Equation 7}\}$$

These embodiments of the model may be constructed using five different states: HI, dHI/dt, RUL, dRUL/dt, and $d^2$RUL/$dt^2$, in which case satisfactory results can be obtained. It should be noted that dRUL/dt and $d^2$RUL/$dt^2$, or the first and second derivatives of the RUL, should be −1 and 0, respectively. As such, this information can be used in the state reconstruction to improve the calculation of RUL.

However, the order of operations results in large runtimes (the big "O" of matrix operation is proportional to the number of states squared ($n^2$), e.g., 25 states in the previously described construction). Moreover, the results show a phase lag, which tends to skew the HI trend and negatively impact the RUL prediction. The phase lag is not unexpected, as a Kalman filter (KF) is a recursive algorithm having a structure similar to an infinite impulse response filter, which has a phase lag. However, to avoid phase lag, a Kalman Smoother (KS) can be implemented, which is a "forward/backward" algorithm. Thus, in an exemplary embodiment, the desired solution is calculated from the backward pass on the forward KF solution:

$$m_{k+1}^- = A_k m_k$$

$$P_{k+1}^- = A_k P_k A_k^T + Q_k$$

$$C_k = P_k A_k^T [P_{k+1}^-]^{-1}$$

$$m_k^s = m_k + C_k[m_{k+1}^s - m_{k+1}^-]$$

$$P_k^s = P_k + C_k[P_{k+1}^s - P_{K=1}^-]C_k^T$$

where:
- $m_k^s$ and $P_k^s$ are mean and covariance smoother estimates, respectively, at time step k;
- $m_k$ and $P_k$ are the Kalman filter estimates of the mean and covariance smoother estimates from the forward pass, respectively, at time step k;
- $m_k^-$ and $P_k^-$ are the mean and covariance smoother predicted states at time step k+1, respectively, which are from the Kalman filter; and
- $C_k$ is the smoother gain.

In an exemplary embodiment, the smoother mean, $m_k^s$, is determined by the current estimated states (e.g., HI, dHI/dt (discussed in more detail below)) plus the product of KS Gain and the innovation, where the innovation is the difference in the forward pass state and the backward pass state. This analysis produces zero lag and thus improves the determination of RUL from HI.

Kalman Smoother State Design

In an exemplary embodiment, the KS is designed to have two states: HI and dHI/dt. dHI/dt is proportional to D (the material constant). Strain, σ, is approximated as mean torque over approximately a 10 minute period proximate the time of desired measurement. In this embodiment, KS includes a value for plant noise (i.e., how fast the HI can change) and for measurement noise (i.e., variance of the HI), where the plant noise is estimated using the minimum time a fault could degrade from an HI of 0 to an HI of 1. In this embodiment, the plant noise, $\sigma^2$, can be set to 0.0001 (equivalent to about 100 hours) and the measurement noise can determined using the method of moments (as described in Bechhoefer, E., He, D., Dempsey, P., "Gear Health Threshold Setting Based on a Probability of False Alarm," Annual Conference of the Prognostics and Health Management Society, 2011, which is incorporated by reference for its discussion of the same), and the HI variance can calculated to be 0.0025. Generally, the statistical properties of HI are similar across all gears, shafts, and bearings, which allows the RUL process to work without the need for individual component tuning values. This is because the HI is the square root of the sum of the inner product of n CIs multiplied by the inverse covariance of the CIs: HI=(CI $\Sigma^{-1}CI^T)^{0.5}$*0.5/v, where v is the a critical threshold value calculated by the inverse Nakagami cumulative distribution function, where η is the number of CIs used in the vector CI, $\Omega=2\eta/\sqrt{(2-\pi/2)}$, and the probability of false alarm is $10^{-6}$.

At a high level, the process described above normalizes the components CIs so that each CI has, in effect, a variance of 1. Thus, the measured RUL can be determined using the reconstructed (e.g. estimated) value of D: RUL=− $(D4\sigma^2\pi a_0)^{-1} \ln(a_0)$.

The measured RUL, determined just above, can then be used to estimate the true RUL using a three state KF: RUL, dRUL/dt, $d^2RUL/dt^2$, where the first and second derivative of RUL establishes the confidence in the RUL. Typically, the rate of change, dRUL/dt (i.e., first derivative), in the RUL should be approximately −1 (i.e., the RUL decreases by one hour for each hour used) and the acceleration, $d^2RUL/dt^2$ (i.e., second derivative), should be 0, for an accurate and stable model.

Although only one Kalman filter could be used, the use of two Kalman reduced order filters improves performance because it removes the need to run the full, five state KS filter on the HI data (to calculated HI, and dHI/dt), as the RUL is calculated on the last (best) estimate of HI and dHI/dt for the component under analysis. As the Kalman filters are order of operations (big "O") of the number of states squared, the runtime of the model, as previously noted, can be greatly reduced by using two filters vs. one larger filter (e.g., big "O" from 25 to 11 in this example). Running two filters thus reduces the computational load thereby reducing the size of the server instance needed to support the application, which in turn reduces recurring cost.

Figure 4:
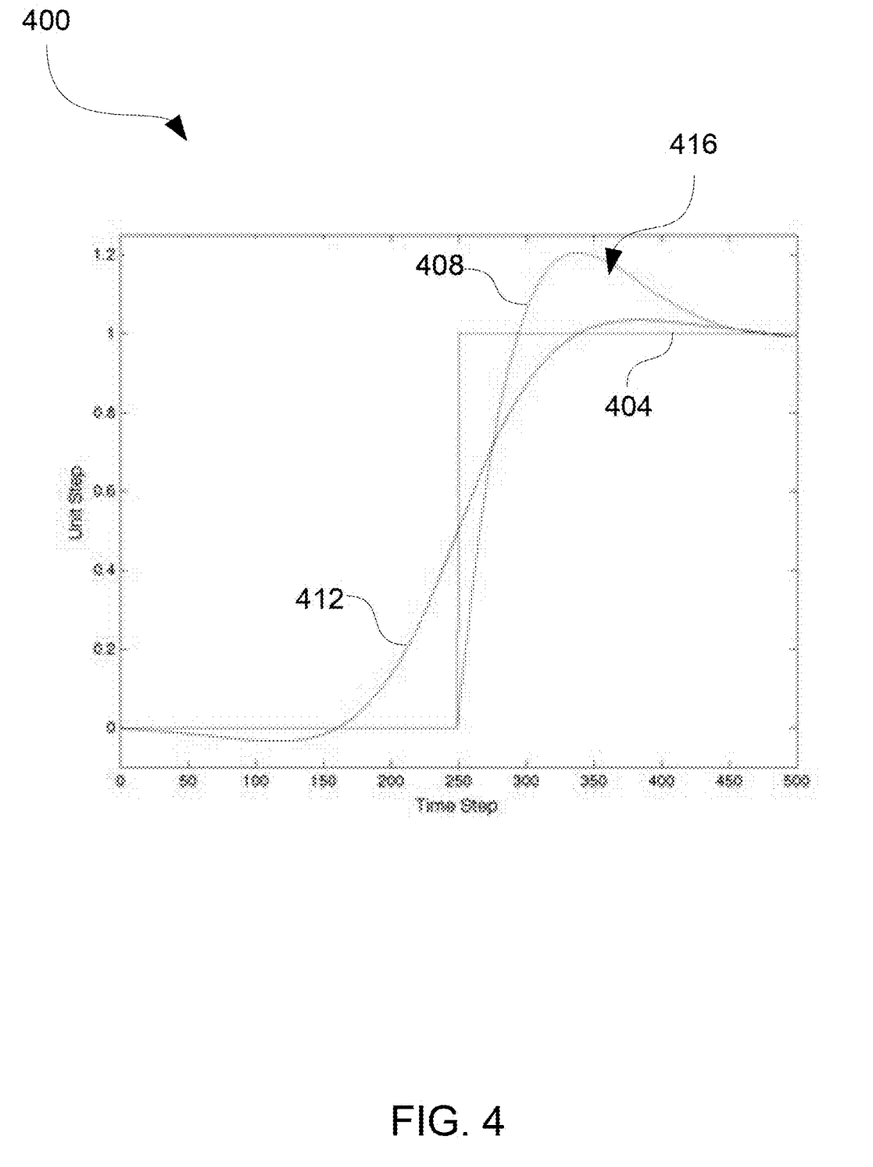
FIG. 4 is a graph of response over time for types of data processing according to an embodiment of the present invention.

To visualize the improvement offered by implementation of the KS filter in addition to the KF filter, FIG. 4 shows a graph 400 of response over time for a step response 404, KF filter response 408, and a KS filter response 412. As shown, KS filter 412 is symmetric around step response 404 and settles sooner than KF response 408, with the gap between KS filter response 412 and KF filter response 408 being a phase delay 416. In an exemplary application, when using high speed bearing operational HI data having a time series of 1.6e-2, the RMS value of the KS filter is about 4.125e-4 compared to RMS value of the KF filter of about 6e-3. The difference between the RMS values is about an 11.6 dB reduction in noise, which indicates that the KS filter is both more responsive to changes in the data, such as changes due to a fault, and has higher process gain in terms of de-noising the component HI.

In an exemplary embodiment, HI thresholds can be set using an automated process, such as the process described in Bechhoefer, E.; He, D.; Dempsey, Paula, "Processing for Improved Spectral Analysis", Annual Conference of the Prognostics and Health Management Society, 2011, which is incorporated in its entirety for its discussion of the same, to minimize personnel cost. The process can marshal the CI sample data automatically by component, over all machines at a site, generate statistics, and then write an XML configuration file. Contemporaneous with writing the file or at most anytime thereafter (assuming the file is saved), the process can apply the new thresholds to the measured CI so as to generate HI data. After developing the HI data, the process can conduct the RUL analysis as described herein, to determine the RUL of each component under observation. In an exemplary embodiment, while CI data is downloaded every 30 minutes, the RUL analysis can be performed more intermittently, such as a few times a day. The frequency of analysis would depend on many factors, including, but not limited to, the type of component under observation, the health of the component (components in "worse" condition may be monitored more frequently), the expected loads on the component, etc.

Figure 5:
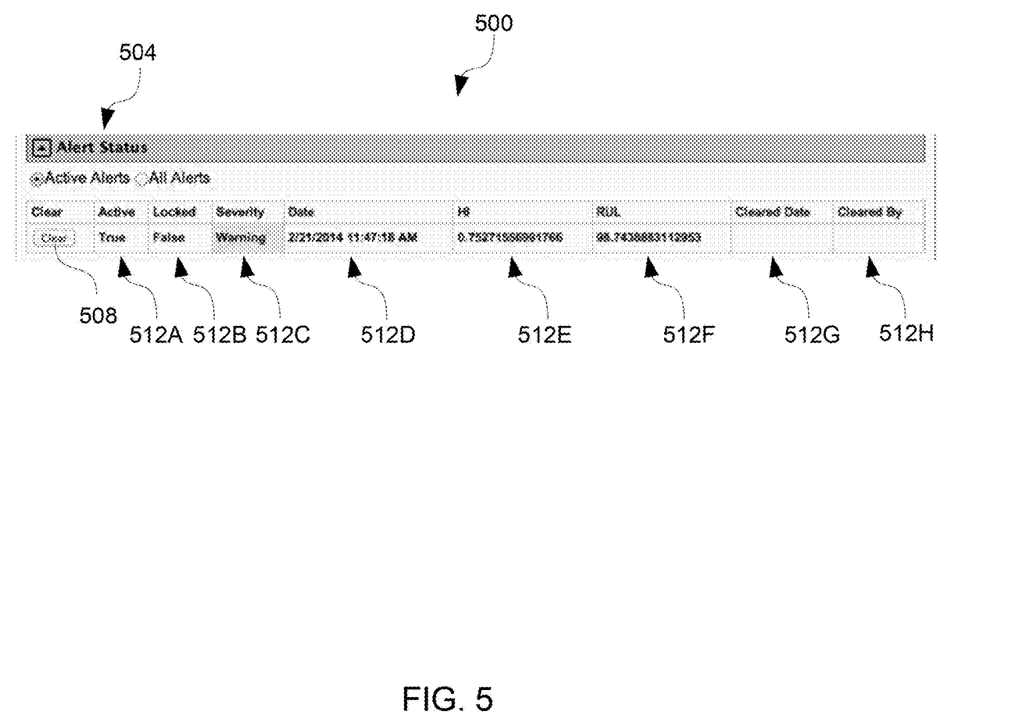
FIG. 5 is an exemplary operator's display report reporting warnings after analysis by an exemplary system according to an embodiment of the present invention.

After conducting the analysis, as noted, system 300 (FIG. 3) is configured to transmit the results to an alert system, such as alert system 312. Alert system 312 can be configured to display different messages to an operator depending on the RUL determined by processing module 308. An example of an operator's display 500 is shown in FIG. 5. In this example, alert system 312 displays an alert only when the HI is greater than about 0.5 and when the confidence in the analysis is high (e.g., the first derivative of the RUL with respect to time is approximately −1 (that is, the analysis indicates that for every hour of usage, one hour of life is consumed) and that the second derivative of the RUL with respect to time is approximately 0, which indicates that the analysis is stable or converged). Alert system 312 can automatically generate warnings when the HI is greater than about 0.75, and alarms when the HI are above 1. Other HI values of interest can also be displayed by alert system 312 as desired by the operator.

As shown in FIG. 5, operator's display 500 can include a number of interactive and informational features. For example, and as shown in the embodiment of FIG. 5, operator's display 500 can include an alert option 504 that provides the operator the option to review only "Active Alerts" or "All Alerts". An operator may be able to "clear" the alert by depressing the clear button 508 for any alert that the operator wishes to ignore. Operator's display 500 can also display certain information in columns 512A-H. For example, whether the alert is "Active" in column 512A, whether the alert is "Locked" in column 512B, the "Severity" of the alert in column 512C, the "Date" and time of the analysis in column 512D, the "HI" value in column 512E, the "RUL" value in column 512F, a "Cleared Date" in column 512G, and a "Cleared By" in column 512H. More or fewer columns of information may be included depending on, among other things, the components under observation and/or operator preferences.

Figure 6:
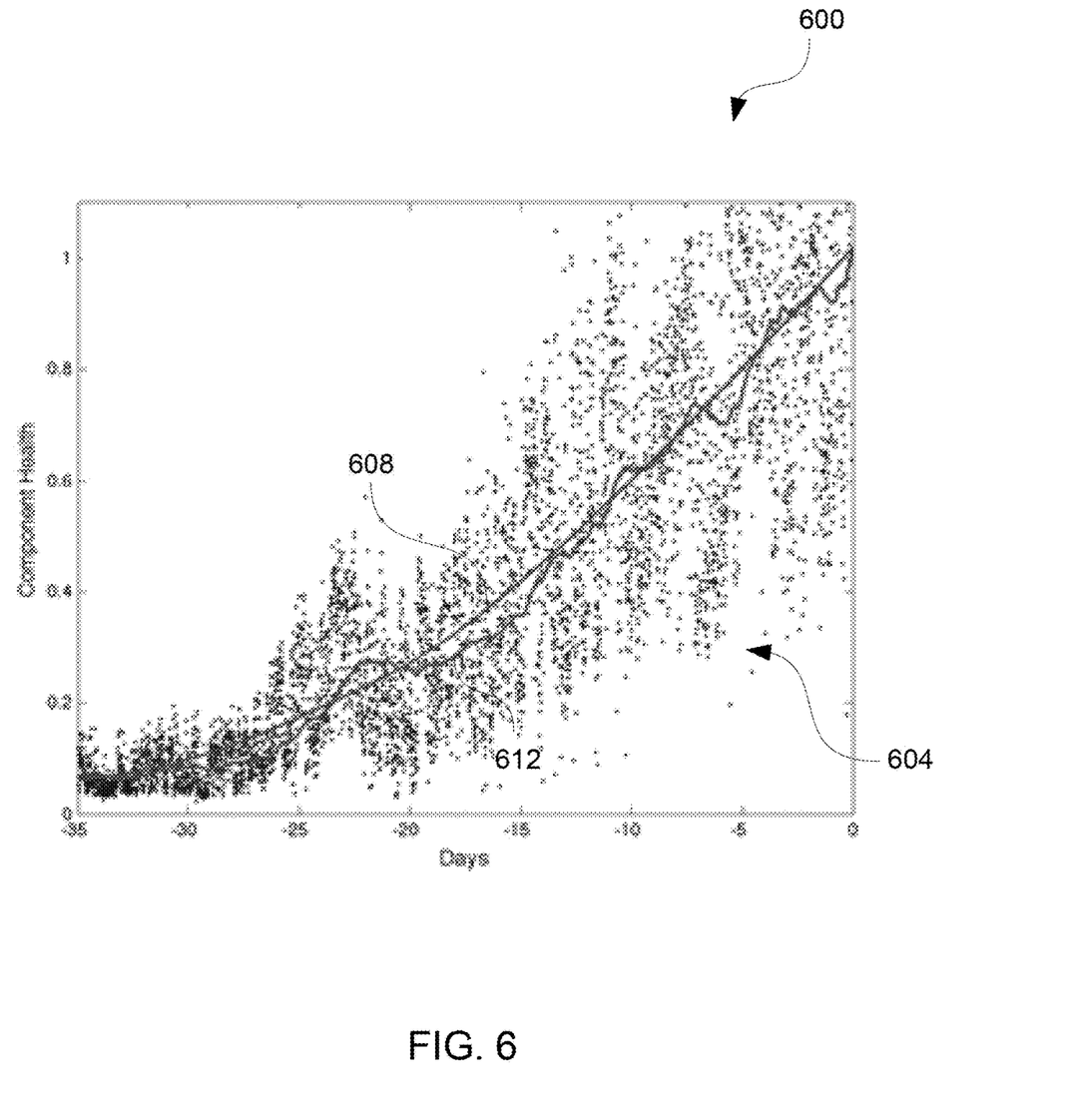
FIG. 6 is a graph of component health over time for a component under analysis by an exemplary system according to an embodiment of the present invention.

Turning now to a discussion of FIG. 6, there is shown a graph 600 showing exemplary raw HI data 604 (component health vs. RUL (in days)) of a component under observation. As shown, raw HI data 604 includes noise that increases with fault severity (i.e., as RUL decreases). A subsequent analysis of raw HI data 604 showed that about 25% of the variance in the raw HI data was due to the variation in the shaft speed of the component. Correction of raw HI data 604, to reduce or elimination impacts of shaft speed, can be done through the use of a resampling algorithm (similar to TSA, but for bearings (discussed in Bechhoefer, E., Van Hecke, B., He, D., "Processing for Improved Spectral Analysis", Annual Conference of the Prognostics and Health Management Society, 2013, which is incorporated in its entirety for its discussion of the same).

Graph 600 also includes the KS smoother line 608 and KF filter line 612, which were developed using the method described herein. As shown, KS smoother line 608 is smoother then KF filter line 612, and has removed local trend issues that the KF filter is sensitive to. For example, at −20 days, KF line 612 trends downward-conceptually, this would indicate that the bearing "repaired" or healed itself, which of course, has not happened.

Figure 7:
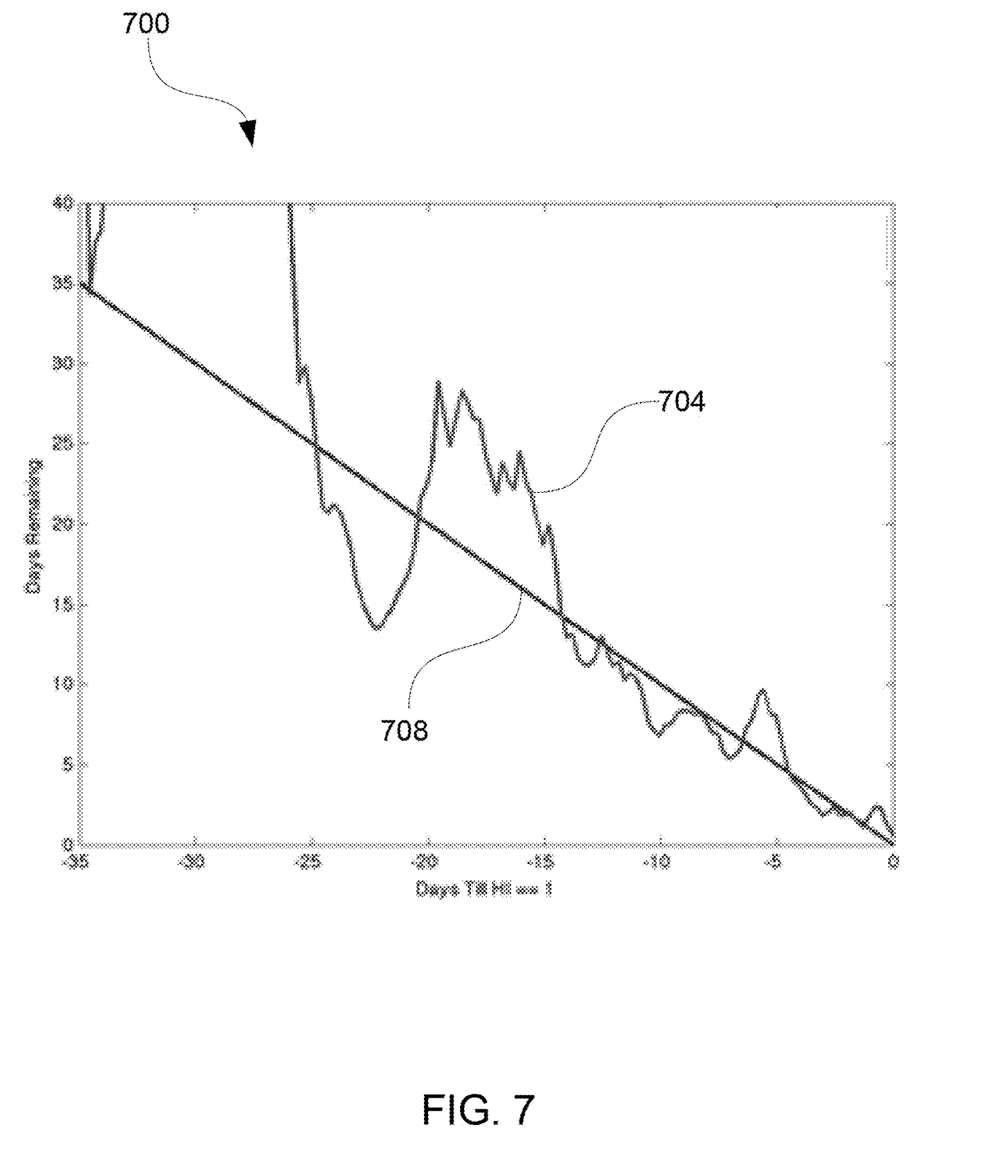
FIG. 7 is a graph of remaining useful life over time for a component under analysis by an exemplary system according to an embodiment of the present invention.

FIG. 7 is a graph 700 of days remaining versus days until HI equals 1 (i.e., lower boundary of when maintenance should be done). There are two lines on graph 700, actual RUL 704 and predicted RUL 708. As shown, predicted RUL 708 approaches the actual RUL 704 at about time −25. The differences between the actual RUL 704 and predicted RUL 708 can be because while actual RUL 704 is a function of torque (e.g., load), thus making the local rate of change in HI sensitive to accrued torque/usage, predicted RUL 708 is based on future load (e.g., mean torque). Therefore, the range in predicted RUL 708 can be controlled by applying, for example, an 80% confidence bound on torque. As a specific example, for a helicopter, an improved RUL could include characterizing the torque by mission and thus use the expected torque for a given mission to derive a predicted RUL that may more closely reflect the actual RUL.

Figure 8:
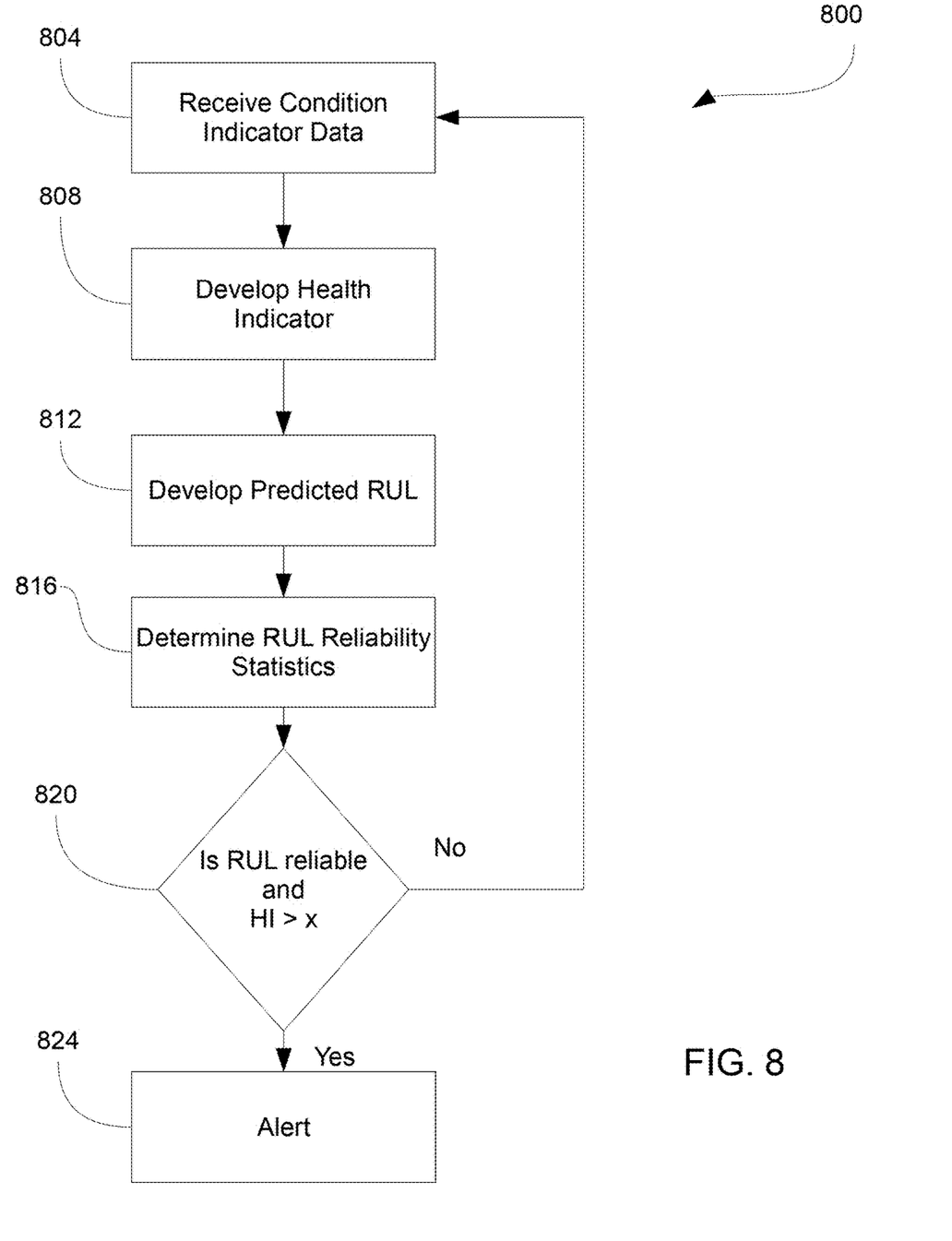
FIG. 8 is a process diagram of a method of predicting the remaining useful life of a component and alerting an operator according to an embodiment of the present invention.

With reference now to FIG. 8 there is shown a process 800 for determining a predicted RUL for a rotating component under observation.

At step 804, condition indicator data is received in from one or more sensors proximate the component desired to be observed. In an exemplary embodiment, the sensor is a strain gauge, although other sensors could also be used, including, but not limited to, an acoustic emission sensor, a vibration sensor, etc., capable of sending a signal including information representative of a torque/load applied to the component under observation.

At step 808, the data received at step 804 is used to develop a health indicator (HI) using a whitening linear transform.

At step 812, the HI developed at step 808 is used to develop a predicted RUL using a power law function (such as Paris' law) in combination with one or more filters. For example, an unscented Kalman filter can be followed by a Kalman Smoother filter to provide a predicted RUL.

At step 816, reliability statistics of the RUL are determined. In an exemplary embodiment, the rate of change and acceleration of the predicted RUL is determined and evaluated so as to determine the reliability of the predicted RUL.

At step 820, if the reliability of the predicted RUL is high and the HI is greater than a predetermined value, x, an alert system is notified at step 824. If the reliability of the predicted RUL is low and/or the HI is lower than a predetermined value, x, the process returns to step 804.

Figure 10:
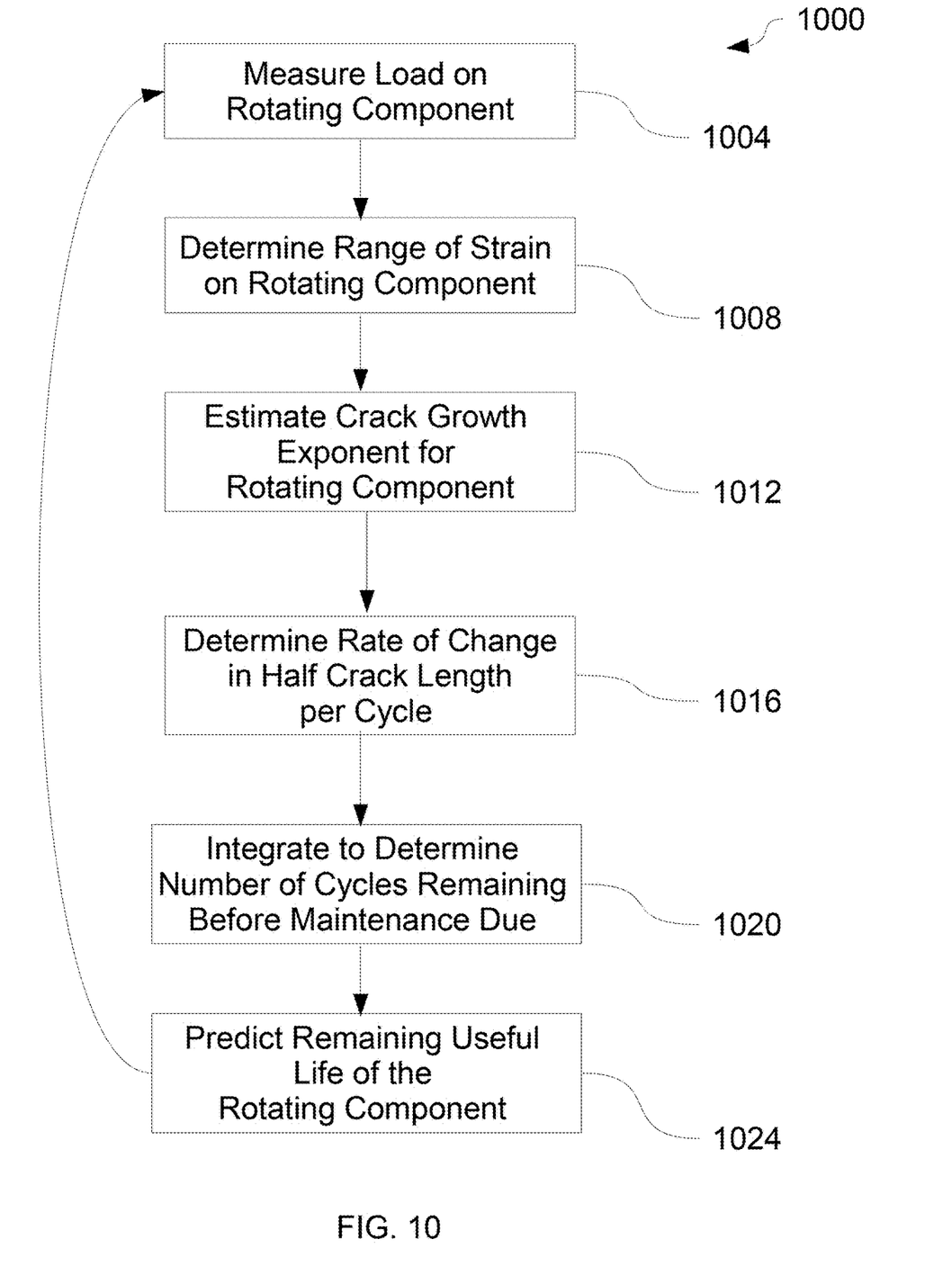
FIG. 10 is a process diagram of a method of predicting the remaining useful life of a rotating component according to another embodiment of the present invention.

With reference now to FIG. 10, there is shown a process 1000 for determining a predicted RUL for a rotating component under observation. At step 1004, a load on a rotating component to be observed/analyzed is measured by a sensor (or sensors) proximate the component desired to be observed. In an exemplary embodiment, the sensor is a strain gauge, although other sensors could also be used, including, but not limited to, an acoustic emission sensor, a vibration sensor, etc., capable of sending a signal including information representative of a torque/load applied to the component under observation. It should be noted that the raw time domain information requires signal processing techniques to enhance the fault feature (typically called condition indicators), which are mapped into a health indicator, which is proportional to crack length.

At step 1008, the data obtained at step 1004 is used to determine the range of strain on the rotating component. Strain range is often correlated with fatigue crack growth and is determined in part by detecting gross strain. Since gross strain can be difficult to directly measure, a surrogate, such as measured torque, can be used. From the gross strain (as derived from torque measurements), α, an estimated geometric correction factor, a (crack length), and an initial assumption about the crack growth exponent (m) based on the material composition of the rotating component, the range of strain, or $\Delta K$, can be estimated by $\Delta K = 2\sigma a(\pi a)^{1/2}$. This estimated range of strain then allows for a determination of D', which includes the range of strain with its constants combined with the material constant of the rotating component. (Note that D' may also be calculated directly by using Equation 6.) Using this determined value for D' along with an estimated rate of change in the half crack length per cycle that is also based on the preliminary determinations in steps 1004 and 1008, a new estimate for the crack growth exponent is developed at step 1012 via Equation 5 as discussed above. This crack growth exponent is based on observed measurements and thus may be more accurate than an initial estimate based only on the material composition of the rotating component, and it may be further refined based on iterative measurements and determinations. Small improvements in the estimated value of the crack growth exponent can result in significant improvements in ultimate RUL estimation due to its influence over da/dN.

At step 1016, the rate of change in the half crack length per cycle is determined using this determined crack growth exponent value for m in $da/dN = D(\Delta K)^m$ as discussed above. Integrating at step 1020 yields the number of cycles remaining before the rotating component is likely to require maintenance or replacement. Since the number of cycles corresponds with time, a remaining useful life value is predicted in step 1024. As noted prior, the component health indicator is a surrogate for crack length, which is used in the actual calculation.

Figure 9:
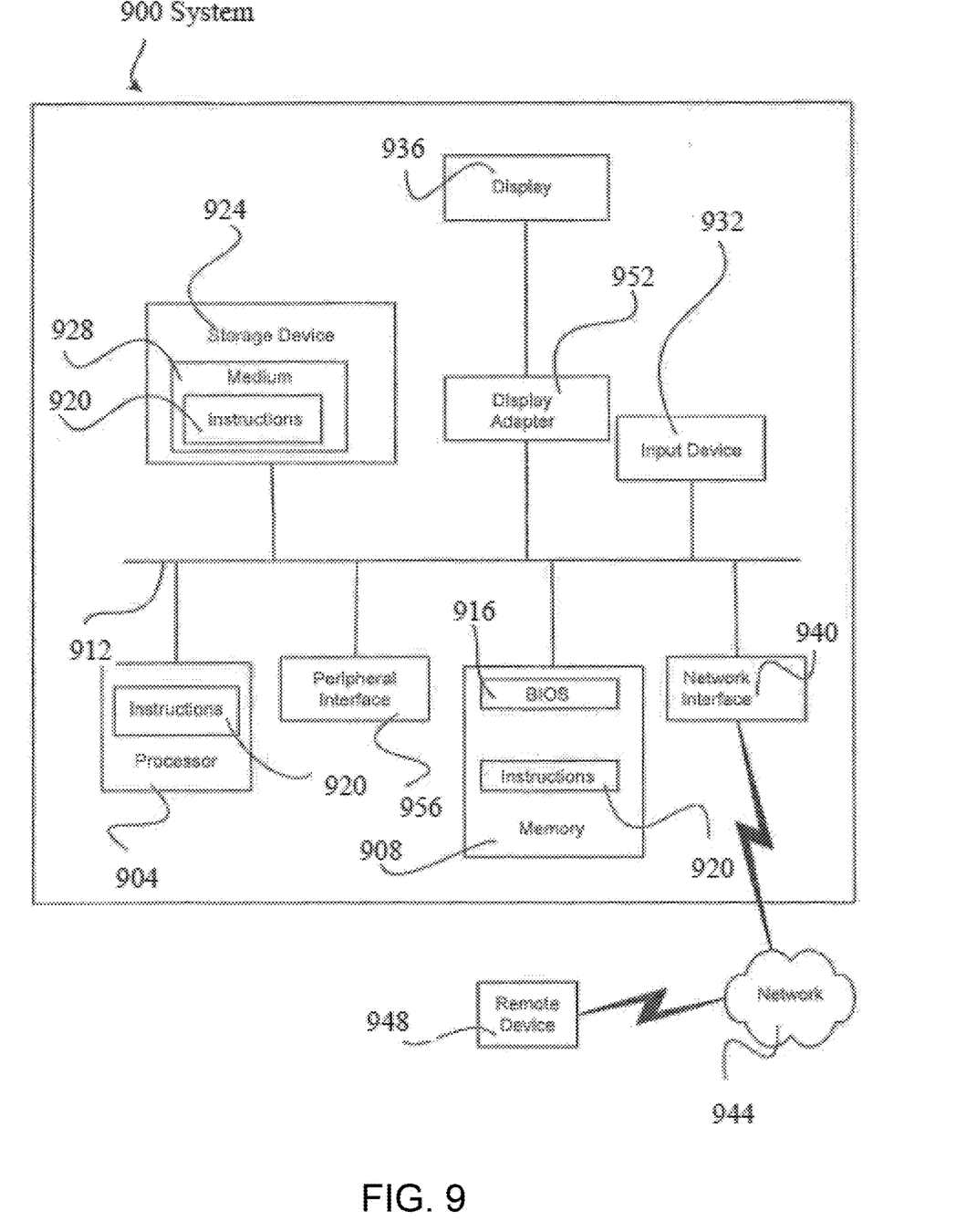
FIG. 9 is a schematic representation of a computer system suitable for use with a rotating body monitoring and alert system and method according to an embodiment of the present invention.

FIG. 9 shows a diagrammatic representation of one embodiment of computing system in the exemplary form of a computing system 900, e.g., a computing device or mobile device, within which a set of instructions for causing a processor 904 to perform any one or more of the aspects and/or methodologies, such as process 800, of the present disclosure. It is also contemplated that multiple computing devices may be utilized to implement a specially configured set of instructions for causing system 300 to perform any one or more of the aspects and/or methodologies of the present disclosure.

Computing system 900 can also include a memory 908 that communicates with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Memory 908 may include various components (e.g., machine readable media) including, but not limited to, a random access memory component (e.g., a static RAM "SRAM", a dynamic RAM "DRAM", etc.), a read only component, and any combinations thereof. In one example, a basic input/output system 916 (BIOS), including basic routines that help to transfer information between elements within computing system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computing system 900 may also include a storage device 924, such as, but not limited to, the machine readable storage medium described above. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computing system 900 (e.g., via an external port connector (not shown)). Particularly, storage device 924 and an associated machine-readable medium 928 may provide nonvolatile and/or volatile storage of machine-readable instructions, data structures, program modules, and/or other data for computing system 900. In one example, software 920 may reside, completely or partially, within a non-transitory machine-readable medium 928. In another example, software 920 may reside, completely or partially, within processor 904 or, for example, in processing module 308.

Computing system 900 may also include an input device 932. In one example, a user of computing system 900 may enter commands and/or other information into computing system 900 via input device 932. Examples of an input device 932 include, but are not limited to, sensor 304, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touch screen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computing system 900 via storage device 924 (e.g., a removable disk drive, a flash drive, etc.) and/or network interface device 940. A network interface device, such as network interface device 940 may be utilized for connecting computing system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network, a telephone network, a data network associated with a telephone/voice provider, a direct connection between two computing devices, and any combinations thereof. A network, such as network 944, may employ a wired and/or a wireless mode of communication. In general, any network topology may be used. Information (e.g., data, software 920, etc.) may be communicated to and/or from computing system 900 via network interface device 940.

Computing system 900 may further include a video display adapter 952 for communicating a displayable image to a display device, such as display device 936. For example, display device 936 may be used by alert system 312 to notify an operator of the condition of a component under observation. Examples of a display device include, but are not limited to, a liquid crystal display (LCD), a cathode ray tube (CRT), a plasma display, a light emitting diode (LED) display, and any combinations thereof. In addition to a display device, a computing system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The system and method disclosed herein has one or more of the following advantages:

1. Removes phase lag from the health indicator trend of a component
2. Uses a "backward/forward" filtering mechanism, which is anti-causal.
3. Wherein the backward/forward method, as in one type a filter, the Kalman Smoother, allows a better calculation of component health, and the rate of change of health, through state reconstruction.
4. That the use of component health and/or rate of change of health can be used as a surrogate for crack length and rate of change of crack length, in the calculation of the material constant in Paris' Law.
5. That torque or some other measure of load (such as power) can be used as a surrogate for range of strain.
6. That these surrogate values can be used to calculate the component remaining useful life.
7. That after determining remaining useful life, from Paris' Law or some other power law, filtering using a state reconstruction technique, such as Kalman Filtering, to estimate first and second derivatives of the remaining useful life.
8. That the estimate first and second derivatives of the remaining useful life can be used to quantify the confidence in the RUL estimate.
9. That a high confidence RUL has a first derivative of approximately −1 (e.g. one hour of life is consumed for every hour of usage.
10. That a high confidence RUL has a second derivative of approximately 0, which indicates the RUL model is converged.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A monitoring and alert system for estimating the remaining useful life of a rotating component of a machine, the system comprising:
   a sensor positioned and configured to measure a load on the rotating component, the sensor sending a signal representative of the measured load;
   a processing module configured to receive the signal, the processing module including a processor executing a set of instructions for:
      developing a health indicator (HI) of the rotating component based upon the signal and a condition indicator of the rotating component, wherein the condition indicator is an assessment of nonconformity of the rotating component;
      developing a predicted remaining useful life (RUL) of the rotating component based upon the HI;
      determining a dHI/dt, a dRUL/dt, and a $d^2RUL/dt^2$;
      applying a first filter to the HI and the dHI/dt determinations, wherein the first filter is an anti-causal backward/forward filter; and
      applying a second filter to the predicted RUL, the dRUL/dt, and the $d^2RUL/dt^2$ determinations.

2. The monitoring and alert system according to claim 1, wherein the HI is developed using a whitening linear transform.

3. The monitoring and alert system according to claim 1, wherein the sensor includes one or more of a strain gauge, a vibration sensor, and an acoustic emission sensor.

4. A method of monitoring a rotating component of a machine comprising:
   receiving data representative of a load on the rotating component and a condition of the rotating component from a sensor on the vehicle, wherein the condition is an assessment of nonconformity of the rotating component;
   generating a health indicator (HI) based upon the received data;
   predicting a remaining useful life (predicted RUL) of the rotating component based upon the HI;
   evaluating the HI and RUL so as to determine whether to alert an operator as to the condition of the rotating component, wherein the evaluation includes:
      determining a dHI/dt, a dRUL/dt, and a $d^2RUL/dt^2$;
      applying a smoother function to the HI and the dHI/dt determinations;
      applying a filter to the predicted RUL, the dRUL/dt, and the d2RUL/dt² determinations; and
      determining a measure of confidence in the predicted RUL based on the dRUL/dt, and the $d^2RUL/dt^2$ determinations.

5. The method according to claim 4, wherein the generating is performed by using a whitening linear transform.

6. The method according to claim 4, wherein the dRUL/dt is compared against a value of −1 and the $d^2RUL/dt^2$ is compared against a value of 0.

7. The method according to claim 6, wherein, when the HI is above about 0.5, the dRUL/dt is approximately −1, and the $d^2RUL/dt^2$ is approximately 0, the operator is alerted as to the condition of the rotating component.

8. The method according to claim 7, wherein the predicting uses a surrogate for range of strain that is a measure of predicted load on the rotating component.

9. A system for monitoring the condition of a rotating component of a machine, wherein the component has a composition, the system comprising:
   a sensor positioned and configured to measure a load on the rotating component, the sensor sending a signal representative of the measured load;
   a processing module configured to receive the signal, the processing module including a processor executing a set of instructions for:
      determining a range of strain experienced by the rotating component based on the measured load;
      estimating a crack growth exponent based on a material constant of the rotating component, the range of strain, and an estimated rate of change in the half crack length per cycle;
      determining a rate of change in a half crack length per cycle based on the material constant of the rotating component, the range of strain, and the estimated crack growth exponent of the rotating component;
      integrating the rate of change in the half crack length per cycle to determine a number of cycles remaining before maintenance of the rotating component is required; and
      determining a predicted remaining useful life of the rotating component based upon the number of cycles remaining.

10. The system according to claim 9, wherein determining a range of strain includes determining an amount of torque experienced by the rotating component.

11. The system according to claim 9, wherein the estimated rate of change in the half crack length per cycle is based in part on an initial assumed crack growth exponent value based on the composition of the rotating component.

12. The system according to claim 11, wherein the estimating a crack growth exponent includes using a transformation filter.

13. The system according to claim 12, where the filter is a Kalman filter, an unscented Kalman filter, an extended Kalman filter, or a particle filter.

* * * * *